(12) United States Patent
Kodama

(10) Patent No.: US 8,861,225 B2
(45) Date of Patent: Oct. 14, 2014

(54) CAPACITOR MOUNTING CONSTRUCTION

(75) Inventor: Shinji Kodama, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 45 days.

(21) Appl. No.: 12/687,172

(22) Filed: Jan. 14, 2010

(65) Prior Publication Data

US 2010/0232130 A1  Sep. 16, 2010

(30) Foreign Application Priority Data

Mar. 10, 2009  (JP) ................................. 2009-056746

(51) Int. Cl.
*H05K 7/02* (2006.01)
*H05K 7/04* (2006.01)
*H01G 2/10* (2006.01)
*H01G 2/04* (2006.01)

(52) U.S. Cl.
CPC ................. *H01G 2/106* (2013.01); *H01G 2/04* (2013.01); *H01G 2/10* (2013.01)
USPC .......... 361/811; 361/782; 361/821; 439/76.1; 439/620.21

(58) Field of Classification Search
USPC ............. 361/811, 782, 821; 439/76.1, 620.21
See application file for complete search history.

(56) References Cited

U.S. PATENT DOCUMENTS

| | | | |
|---|---|---|---|
| 4,813,642 A | 3/1989 | Matsui | |
| 5,577,937 A * | 11/1996 | Itoh et al. ................. | 439/620.22 |
| 6,109,973 A * | 8/2000 | Gronowicz et al. ....... | 439/620.21 |
| 6,400,551 B1 * | 6/2002 | Lin et al. .................... | 361/301.3 |
| 2006/0073738 A1 * | 4/2006 | Nagaoka et al. ............. | 439/721 |
| 2007/0270019 A1 | 11/2007 | Yamaguchi et al. | |
| 2008/0304211 A1 | 12/2008 | Shimizu | |
| 2009/0009981 A1 | 1/2009 | Shimizu | |
| 2009/0017653 A1 | 1/2009 | Shimizu | |
| 2009/0042444 A1 * | 2/2009 | Shimizu ................... | 439/620.21 |
| 2009/0042456 A1 | 2/2009 | Yamaguchi et al. | |
| 2009/0139741 A1 | 6/2009 | Shimizu | |

FOREIGN PATENT DOCUMENTS

| | | |
|---|---|---|
| DE | 10 2007 020 560 A1 | 11/2007 |
| DE | 10 2008 027 042 A1 | 12/2008 |
| DE | 10 2008 031 967 A1 | 1/2009 |
| DE | 10 2008 032 168 A1 | 1/2009 |
| DE | 10 2008 037 274 A1 | 2/2009 |
| DE | 10 2008 052 866 A1 | 6/2009 |
| JP | 05-78129 | 10/1993 |

(Continued)

OTHER PUBLICATIONS

Office Action dated Jan. 8, 2013 issued by the Japanese Patent Office in counterpart Japanese Application No. 2009-056746.

(Continued)

*Primary Examiner* — Andargie M Aychillhum
(74) *Attorney, Agent, or Firm* — Sughrue Mion, PLLC

(57) ABSTRACT

A capacitor mounting construction includes housing, a bracket and an urging member. The housing has a capacitor accommodating space configured to accommodate a capacitor and a wire accommodating space configured to accommodate a wire extended from the capacitor. The bracket is engaged with the housing, is configured to fix and electrically connect the wire to a conductive member in the wire accommodating space, and covers the capacitor accommodating space to define a capacitor accommodating chamber. The urging member is provided on an inner wall of the capacitor accommodating chamber, and is configured to urge the capacitor to contact another inner wall of the capacitor accommodating chamber.

9 Claims, 3 Drawing Sheets

(56) References Cited

FOREIGN PATENT DOCUMENTS

| | | |
|---|---|---|
| JP | 06-26243 | 4/1994 |
| JP | 2000133908 A | 5/2000 |
| JP | 2005183492 A | 7/2005 |
| JP | 2008204988 A | 9/2008 |
| JP | 2008270460 A | 11/2008 |
| JP | 2008306839 A | 12/2008 |

OTHER PUBLICATIONS

Office Action issued Jun. 15, 2011, in German Application No. 102010001524.5.

* cited by examiner

CAPACITOR MOUNTING CONSTRUCTION

BACKGROUND

The present invention relates to a capacitor mounting construction for a capacitor which is mounted on a body of a motor vehicle.

In conventional electrical equipment that is installed on a body of a motor vehicle, it is general practice to provide an electrical component with antivibration means to prevent the electrical component from being affected badly by vibration in the body.

As an example of such conventional antivibration means, there has been proposed a mounting construction for fixing lead wires of a capacitor as an electrical component to a circuit board with flexible portions in a spiral or other form provided between fixing portions where the lead wires of the capacitor are fixed to the circuit board and the capacitor, while an elastic member is interposed between the circuit board on which the capacitor is mounted and the capacitor (refer to FIG. 1 of Patent Document 1). This proposed mounting construction is such that when vibrations are transmitted from the body to the circuit board, the vibration of the capacitor is absorbed by displacements of the elastic member and the flexible portions of the lead wires, so as to mitigate the vibration of the capacitor.

As another conventional example, there has been proposed an electrical component mounting construction in which a plurality of elastic tongue pieces are provided on an upper face of a junction box in which electrical components such as relays are mounted so as to be erected therefrom and an electrical component with terminals attached thereto is supported while being held by the plurality of elastic tongue pieces (refer to FIG. 1 of Patent Document 2). The proposed mounting construction is such that when vibrations are transmitted from the body to the junction box, the vibration of the electrical component is absorbed by displacements of the elastic tongue pieces, so as to mitigate the vibration of the electrical component.

[Patent Document 1] Japanese Utility Model Publication No. 6-26243 A

[Patent Document 2] Japanese Utility Model Publication No. 5-78129 A

In the mounting constructions of Patent Documents 1, 2 above, even though the electrical component is accommodated in the box, since the vibration of the electrical component is mitigated, a risk is small that a problem is caused that abnormal noise is generated by the electrical component striking the box. In the mounting construction of Patent Document 1, however, since the lead wires vibrate, loads are exerted repeatedly on the lead wires, leading to a problem that the durability of the lead wires is damaged. Similarly, also in the mounting construction of Patent Document 2, since the electrical component vibrates against the terminals attached to the upper surface of the junction box, loads are exerted repeatedly on the terminals, and the durability of the terminals is damaged.

SUMMARY

It is therefore one aspect of the present invention is to provide a capacitor mounting construction which can improve the durability of the lead wires and the terminals.

According to one aspect of the invention, there is provided a capacitor mounting construction, comprising:

a capacitor;

a housing having a capacitor accommodating space accommodating the capacitor and a wire accommodating space accommodating a wire extended from the capacitor; and a bracket engaged with the housing, fixing and electrically connect the wire to a conductive member in the wire accommodating space, and covering the capacitor accommodating space to define a capacitor accommodating chamber, wherein the capacitor is urged by the wire and is contacted to an inner wall of the capacitor accommodating chamber.

The capacitor mounting construction may be configured such that the wire is bent in a crank shape.

The capacitor mounting construction may be configured such that the inner wall is a part of the bracket.

The capacitor mounting construction the conductive member includes a bus bar and a wire harness.

The capacitor mounting construction the bracket has a clamper configured to be fitted to a mating member.

The capacitor mounting construction may be configured such that the mating member is a body of a vehicle.

According to another aspect of the invention, there is provided a capacitor mounting construction, comprising:

a housing having a capacitor accommodating space configured to accommodate a capacitor and a wire accommodating space configured to accommodate a wire extended from the capacitor;

a bracket engaged with the housing, configured to fix and electrically connect the wire to a conductive member in the wire accommodating space, and covering the capacitor accommodating space to define a capacitor accommodating chamber; and an urging member provided on an inner wall of the capacitor accommodating chamber, and configured to urge the capacitor to contact another inner wall of the capacitor accommodating chamber.

The capacitor mounting construction may be configured such that: the bracket is made of metal; an end portion of the bracket is extended into the wire accommodating space, and electrically connected to the conductive member; a clamper configured to be fitted to a mating member is engaged on a middle part of the bracket, so that a bottom part of the clamper is inserted through the bracket and fixed on an inner face of the bracket exposed to the capacitor accommodating chamber; the urging member has elasticity, is disposed at a position opposing the bottom part of the clamper, and urges the capacitor to the inner face of the bracket via the bottom part of the clamper; and the capacitor mounting construction is attached to a mating member via the bracket.

The capacitor mounting construction may be configured such that the mating member is a body of a vehicle.

DETAILED DESCRIPTION OF EXEMPLIFIED EMBODIMENTS

Exemplified embodiments of the invention are described below in detail with reference to the accompanying drawings.

Figure 1:
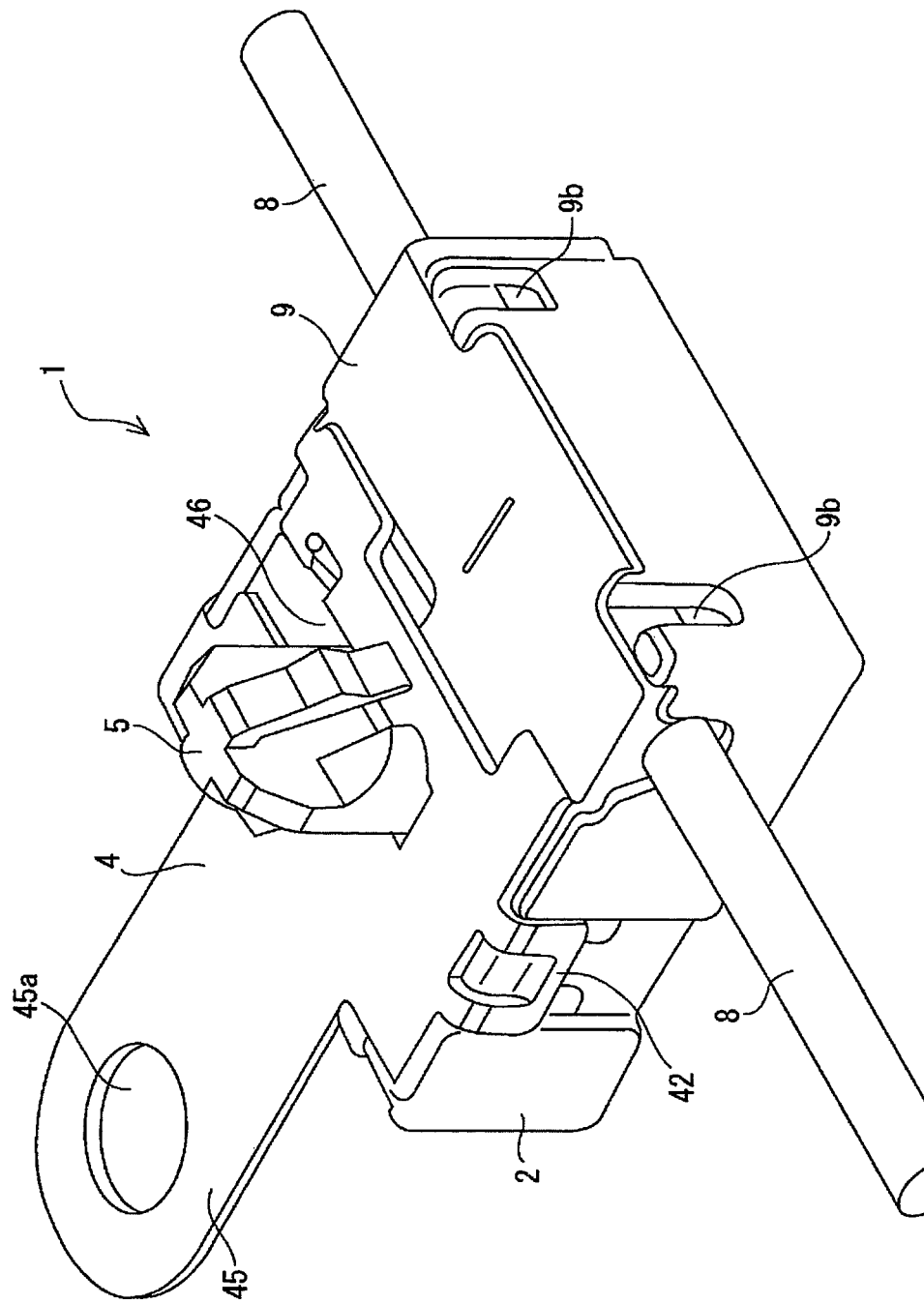
FIG. 1 is a perspective view of a capacitor assembly to which a capacitor mounting construction of the invention is applied.
Figure 2:
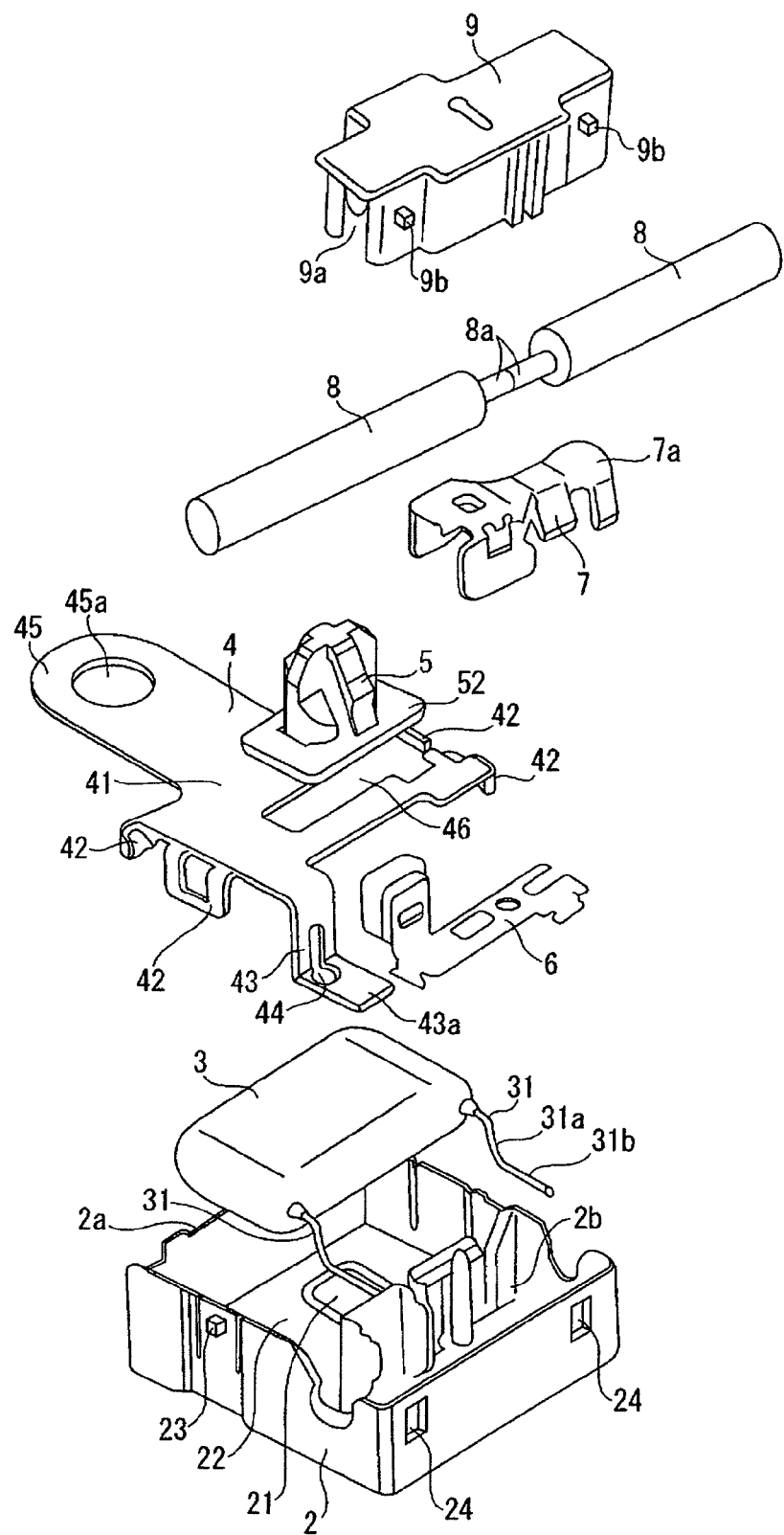
FIG. 2 is an exploded perspective view of the capacitor assembly.
Figure 3:
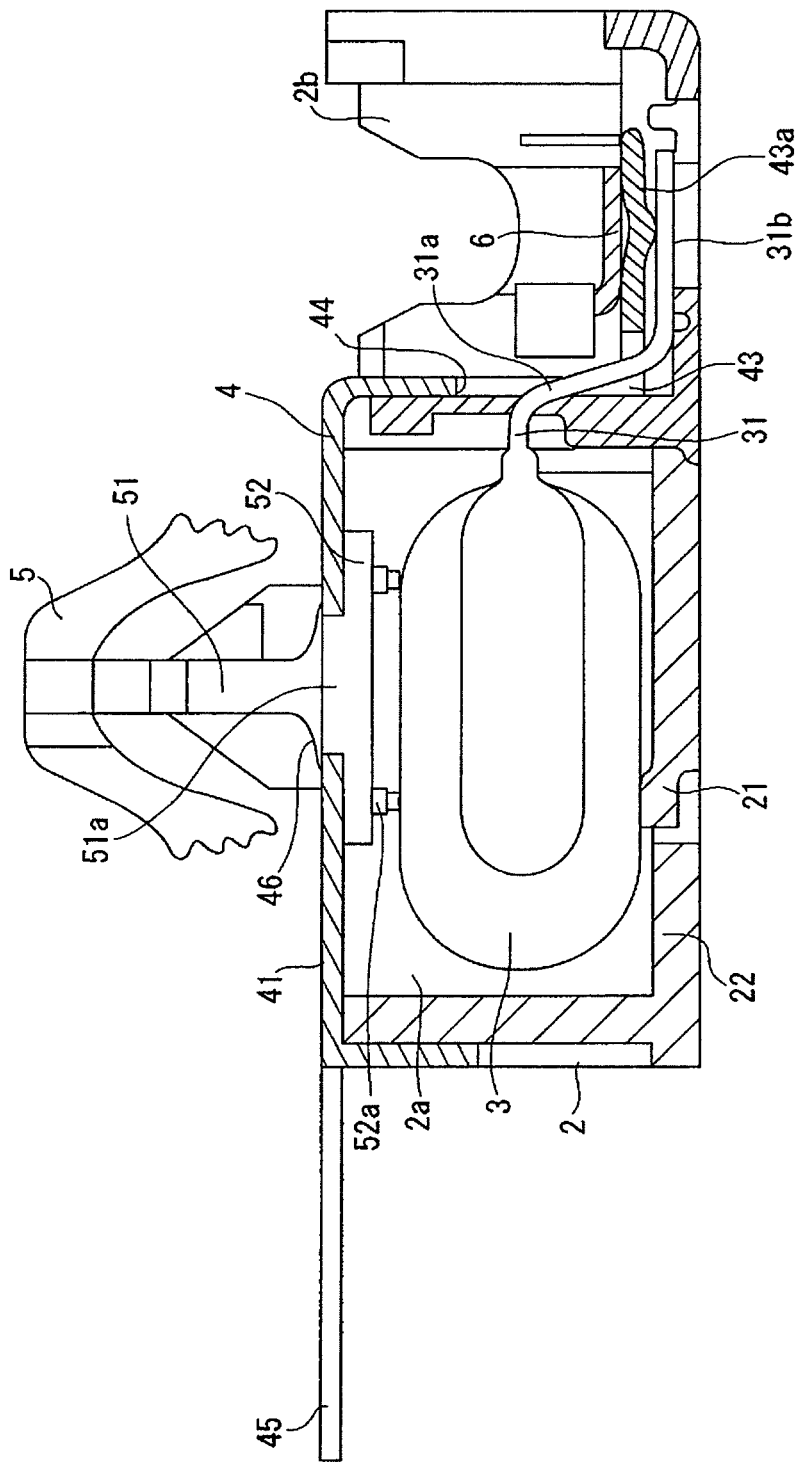
FIG. 3 is a sectional view of the capacitor assembly.

As is shown in FIGS. 1 to 3, a capacitor assembly 1 (a capacitor mounting construction) is made by assembling together a box 2 (a housing) having a capacitor accommodation space 2a and a lead wire connection space 2b, a capacitor 3 which is accommodated in the capacitor accommodation space 2a, a bracket 4 which closes an opening in an upper opening of the capacitor accommodation space 2a of the box 2, a clamp 5 which is attached to the bracket 4, a bus bar 6 which is accommodated in the lead wire connection space 2b, a wire terminal 7 and relay electric wires 8, and a cover 9 which closes an upper opening of the lead wire connection space 2b of the box 2.

The capacitor 3 is accommodated in the capacitor accommodation space 2a of the box 2. The upper opening of the capacitor accommodation space 2a is closed by a longitudinal intermediate portion of the bracket 4 mounted on the box 2, and a ceiling wall of the box 2 is formed by the intermediate portion 41 of the bracket 4, so that the ceiling wall covers the capacitor accommodation space to define a chamber. The clamp 5 is mounted on the intermediate portion 41 of the bracket 4. A fitting portion 51a is provided on a proximal end 52 of the clamp 5 so as to lie between a shaft portion 51 of the clamp 5 and the proximal end 52. By this fitting portion 51a being fitted in a widthwise cutout hole 46 provided in the intermediate portion 41 of the bracket 4 from an opening at one end thereof, the proximal end 52 of the clamp 5 is held in the intermediate portion 41 of the bracket 4. An upwardly projecting tongue-shaped elastic piece 21 is formed on a bottom wall 22 (a bottom part) of the box 2 in a position which opposes the proximal end 52 of the clamp mounted on the bracket 4. The capacitor 3 accommodated in the capacitor accommodation space 2a is brought into abutment with projecting portions 52a which are provided on a lower surface of the proximal end 52 of the clamp 5 by the elastic piece 21 and is then brought into press contact with the intermediate portion 41 of the bracket 4 which makes up the ceiling wall of the box 2 via the proximal end 52 of the clamp 5.

The bracket 4 is made of a metallic plate and constitutes a vehicle body mounting member which doubles as an earth (a ground). The bracket 4 is mounted on the box 2 to cover the upper opening of the capacitor accommodation space 2a by bringing a plurality of locking portions 42 which are provided on an outer surface of the longitudinal intermediate portion 41 into engagement with corresponding locking portions 23 which are provided on side walls of the capacitor accommodation space 2a. A longitudinal end portion of the bracket 4 is formed into a narrow elongated L-shaped frame portion 43 which is extended from a position which lies closer to a widthwise end of the bracket 4. A distal end of the frame portion 43 is formed into a horizontal connection end 43a which is positioned in the lead wire connection space 2b, and a long hole-like opening 44 is formed in the frame portion 43 so as to reach the proximity of the connection end 43a. The other longitudinal end portion of the bracket 4 is made to project to an opposite side to the frame portion 43 and is formed into a mounting piece 45 having a screw hole 45a via which the box 2 is mounted on a vehicle body.

The capacitor 3 includes a pair of lead wires 31 which are led out in parallel in a horizontal direction from sideways positions which lie in close proximity to longitudinal ends of the capacitor 3. The lead wires 31 are bent into a crank shape at intermediate positions along the length thereof and horizontal connection ends 31b are formed at distal ends of bent portions 31a. With the capacitor 3 accommodated in the capacitor accommodation space 2a, one of the lead wires 31 is inserted through the opening 44 in the frame portion 43 of the bracket, and the connection end 31b at the distal end of the lead wire 31 is positioned in the lead wire connection space 2b so as to be laid under the connection end 43a of the frame portion 43. Then, the bus bar 6 is inserted into the lead wire connection space 2b so as to be superposed on the connection end 43a of the frame portion 43 of the bracket 4, and in this condition, the connection end 31b of the lead wire 31, the connection end 43a of the frame portion 43 and a connection end of the bus bar 6 are connected together by welding utilizing a conductive paste.

The wire terminal 7 is used in a posture which results when a posture shown in FIG. 2 is rotated through 180 degrees around an axis of the relay electric wires 8. In the 180-degree rotated posture, relay portions 8a of the relay electric wires 8 are connected together under pressure by a crimping barrel portion 7a of the wire terminal 7 so that the relay electric wires 8 are held by the wire terminal 7 so as to form a wiring harness. The wire terminal 7 which is now formed into the wiring harness is then inserted into a recess portion 9a of the terminal cover 9. Then, the terminal cover 9 into which the wire terminal 7 has been inserted is inserted into the lead wire connection space 2b of the box 2. The wire terminal 7 which holds the relay electric wires 8 is brought into contact with a contact portion of the bus bar 6, and locking portions 9b of the terminal cover 9 are brought into engagement with corresponding locking portions 24 which are provided in a side wall of the lead wire connection space 2b of the box 2. Thus, the upper opening of the lead wire connection space 2b of the box 2 is closed by the terminal cover 9. Finally, the capacitor assembly 1 is built up.

The capacitor assembly 1 that has been so built up is temporarily attached to the vehicle body by fittingly inserting the clamp 5 in a clamp hole in a bearing face provided at a mounting portion of the vehicle body. Following this, a screw hole in the bearing face is aligned with the screw hole 45a in the bracket 4, and the bracket 4 is fixedly fastened to the bearing face with a screw, whereby the capacitor assembly 1 is mounted on the mounting portion of the vehicle body.

The capacitor mounting construction of this embodiment is configured as has been described heretofore, and the capacitor 3 accommodated in the box 2 is brought into press contact with the ceiling wall of the box 2 (the intermediate portion 41 of the bracket 4) via the proximal end 52 of the clamp 5 mounted on the bracket 4 by the elastic piece 21 provided on the bottom wall 22 of the box 2. Therefore, even though vibrations are transmitted from the vehicle body to the box 2, the capacitor 3 vibrates together with the box 2. Consequently, the generation of abnormal noise due to the capacitor 3 striking the box 2 is prevented. Further, the vibration of the lead wires 31 of the capacitor 3 is prevented, and therefore, repeated exertion of loads on the lead wires 31 is prevented, whereby the durability of the lead wires 31 is ensured. In addition, the capacitor 3 is brought into press contact with the box 2 by the elastic piece 21, and therefore, a press contact force with which the capacitor 3 is pressed against the box 2 can be set to a predetermined value without depending upon the elasticity of the lead wires 31. The elastic piece 21 is formed in the position which faces the clamp 5 of the box 2, and therefore, in mounting the box 2 on the mounting portion of the vehicle body, the position of the clamp 5 can be verified from the outside via the elastic piece 21, facilitating the mounting work of the box 2. Further, the capacitor 3 can be electrically connected to the mounting portion via the bracket 4, and no special earthing (grounding) component is required, which simplifies the construction.

In the embodiment, while the capacitor 3 is brought into press contact with the sealing wall of the box 2 (the intermediate portion 41 of the bracket 4) via the proximal end 52 of the clamp 5, the invention is not limited thereto. In the event that a configuration is adopted in which a vehicle body mounting bracket is formed integrally on a box 2 and an upper opening of the box 2 is designed to be closed by a separate lid, a capacitor 3 may only have to be brought into press contact with a ceiling wall of the box 2 which is made up of the lid by an elastic piece 21. Further, a configuration may be adopted in which no elastic piece 21 is provided on a bottom wall 2 of a box 2 and a capacitor 3 is brought into press contact with a ceiling wall of the box 2 by the elastic force of lead wires 31 by changing an angle at which the lead wires 31 which are connected to an electrical member such as a bus bar 6 support the capacitor 3 at a lead wire connection portion 2b of the box 2, and furthermore, the capacitor 3 may be brought into press contact with the bottom wall 22 of the box 2. Similarly, even though vibrations are transmitted from the vehicle body to the box 2, the capacitor 3 vibrates together with the box 2, and therefore, the generation of abnormal noise due to the capacitor 3 striking the box 2 is prevented. In addition, the vibration of the lead wires 31 of the capacitor 3 is prevented, and hence, the durability of the lead wires 31 is ensured. In this case, in the event that crank-shaped bent portions similar to the bent portions 31a are provided on the lead wires 31, the elastic force of the lead wires 31 can be strengthened.

According to the capacitor mounting construction of the invention, even though vibrations are transmitted from the vehicle body to the box which accommodates the capacitor, the generation of abnormal noise due to the capacitor striking the box is prevented, and the durability of the lead wires is also ensured.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims. For example, the capacitor mounting construction is attached to any other mating member than the vehicle body.

The disclosures of Japanese Patent Application No. 2009-056746 filed Mar. 10, 2009 including specification, drawings and claims is incorporated herein by reference in its entirety.

What is claimed is:

1. A capacitor mounting construction, comprising:
    a housing having a capacitor accommodating space configured to accommodate a capacitor and a wire accommodating space configured to accommodate a wire extended from the capacitor;
    a bracket engaged with the housing, configured to fix and electrically connect the wire to a conductive member in the wire accommodating space, and covering the capacitor accommodating space to define a capacitor accommodating chamber having at least a first inner walls and a second inner walls; and
    an urging member, having an elasticity, provided on the first inner wall of the capacitor accommodating chamber, and configured to urge the capacitor to contact the second inner wall of the capacitor accommodating chamber with a predetermined press contact force such that vibration of the housing is transmitted to the capacitor,
    wherein the first and the second inner walls oppose each other, and
    wherein the urging member upwardly extends from the first inner wall in a position which opposes the second inner wall, and
    wherein the first inner wall is a bottom face of the capacitor accommodating chamber,
    wherein the urging member is an upwardly projecting tongue-shaped elastic member connected to the bottom face of the capacitor accommodating chamber.

2. The capacitor mounting construction as set forth in claim 1, wherein:
    the bracket is made of metal;
    an end portion of the bracket is extended into the wire accommodating space, and electrically connected to the conductive member;
    a clamper configured to be fitted to a mating member is engaged on a middle part of the bracket, so that a bottom part of the clamper is inserted through the bracket and fixed on an inner face of the bracket exposed to the capacitor accommodating chamber;
    the urging member, is provided on the first inner wall and disposed at a position opposing the bottom part of the clamper and the second inner wall, and urges the capacitor to the inner face of the bracket via the bottom part of the clamper; and
    the capacitor mounting construction is attached to a mating member via the bracket.

3. The capacitor mounting construction as set forth in claim 2, wherein:
    the mating member is a body of a vehicle.

4. The capacitor mounting construction as set forth in claim 1,
    wherein the wire is bent toward the second inner wall of the capacitor accommodating chamber, and
    wherein the wire urges the capacitor so that the capacitor is press contacted by the second inner wall of the capacitor accommodating chamber with a predetermined press contact force such that vibration of the housing is transmitted to the capacitor.

5. The capacitor mounting construction as set forth in claim 4, wherein:
    the wire is bent in a crank shape.

6. The capacitor mounting construction as set forth in claim 4, wherein:
    the second inner wall is a part of the bracket.

7. The capacitor mounting construction as set forth in claim 4, wherein:
    the conductive member includes a bus bar and a wire harness.

8. The capacitor mounting construction as set forth in claim 4, wherein:
    the bracket has a clamper configured to be fitted to a mating member.

9. The capacitor mounting construction as set forth in claim 8, wherein:
    the mating member is a body of a vehicle.

* * * * *